US006289022B1

(12) United States Patent
Gale et al.

(10) Patent No.: US 6,289,022 B1
(45) Date of Patent: Sep. 11, 2001

(54) METHODS AND SYSTEMS FOR FAULT-TOLERANT DATA TRANSMISSION

(75) Inventors: Alan Andrew Gale, Carver; Samuel Galpin, Hingham, both of MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/028,262

(22) Filed: Feb. 23, 1998

Related U.S. Application Data

(60) Provisional application No. 60/063,205, filed on Oct. 21, 1997.

(51) Int. Cl.[7] .............................. H04L 1/00; H04L 12/26; H04L 12/43; G11C 29/00
(52) U.S. Cl. ...................... 370/412; 370/242; 370/412; 370/458; 714/11; 714/30; 714/43; 714/805
(58) Field of Search ..................... 370/412, 216, 370/242, 401; 714/43, 805, 748, 763, 764, 749, 11, 12, 9, 6, 30, 52, 55; 395/183, 575, 200, 375

(56) References Cited

U.S. PATENT DOCUMENTS

| | | | |
|---|---|---|---|
| 3,825,905 | 7/1974 | Allen, Jr. ........................... | 340/172.5 |
| 4,245,344 | * 1/1981 | Richter .................................. | 371/68 |
| 4,312,068 | 1/1982 | Goss et al. .............................. | 371/37 |
| 4,453,215 | * 6/1984 | Reid ..................................... | 364/200 |
| 4,456,997 | 6/1984 | Spitza ..................................... | 371/68 |
| 4,750,177 | * 6/1988 | Hendrie et al. ......................... | 371/32 |
| 4,817,094 | * 3/1989 | Lebizay et al. ......................... | 371/36 |
| 5,050,165 | 9/1991 | Yoshioka et al. ................. | 370/85.13 |
| 5,163,055 | * 11/1992 | Lee et al. ............................... | 371/32 |
| 5,255,367 | 10/1993 | Bruckert et al. ..................... | 395/200 |
| 5,258,999 | 11/1993 | Wernimont et al. ................... | 375/7 |
| 5,303,230 | * 4/1994 | Hishida et al. ....................... | 370/58.1 |
| 5,450,403 | 9/1995 | Ichii et al. ........................... | 370/85.1 |
| 5,450,425 | 9/1995 | Gunn et al. .......................... | 371/61.1 |
| 5,513,192 | 4/1996 | Jansku et al. ........................ | 371/50.1 |
| 5,559,963 | 9/1996 | Gregg et al. .......................... | 395/200 |
| 5,612,964 | * 3/1997 | Haraszti .............................. | 371/40.1 |
| 5,629,949 | 5/1997 | Zook .................................... | 371/37.1 |
| 5,630,056 | 5/1997 | Horvath et al. ................. | 395/185.09 |
| 5,640,508 | * 6/1997 | Fujiwara et al. ............... | 395/183.06 |
| 5,680,404 | 10/1997 | Gray ....................................... | 371/5.1 |
| 5,915,082 | * 6/1999 | Marshall et al. ................ | 395/182.09 |
| 5,983,371 | * 11/1999 | Lord et al. ............................. | 714/55 |
| 6,032,265 | * 2/2000 | Oguro et al. ............................ | 714/9 |
| 6,038,685 | * 3/2000 | Bissett et al. .......................... | 714/12 |

* cited by examiner

*Primary Examiner*—Wellington Chin
*Assistant Examiner*—M. Phan
(74) *Attorney, Agent, or Firm*—Foley, Hoag & Eliot LLP; W. Hugo Liepmann; Kevin A. Oliver

(57) ABSTRACT

Information is transmitted to a network by a system which receives data from a first processor into a first FIFO and from a second processor into a second FIFO. Data exiting the first FIFO is discarded. As data is received into second FIFO, data exiting the FIFO is transferred to the network. When and end-of-message indication is detected in the received data, the contents of the FIFOs are compared. If a miscompare occurs, transferred data from the second FIFO to the network is caused to be in error. Accordingly, a message sent to the network from the second FIFO will be rejected either by the network or by a receiving node.

30 Claims, 5 Drawing Sheets

*PRIOR ART*

METHODS AND SYSTEMS FOR FAULT-TOLERANT DATA TRANSMISSION

THIS APPLICATION CLAIMS BENEFIT OF PROVISIONAL APPLICATION Ser. No. 60/063,205 filed Oct. 21, 1997.

TECHNICAL FIELD

The present invention relates, in general, to fault-tolerant computing. More particularly, the present invention relates to methods and systems for fault-tolerant transmission of information.

BACKGROUND OF THE INVENTION

The reliability of computer based applications continues to be an important consideration. Moreover, in fault-tolerant computing applications, insuring that a fault-tolerant pair of CPUs agree on a result, and transmit the agreed-to result to a network (e.g., an Ethernet bus) is a critical function. Several prior techniques have been used to perform this function, but all have certain deficiencies.

As an example, turning to FIG. 1, two CPUs, namely CPU A 11 and CPU B 13 redundantly process information. Communications subsystems A 15 and B 17 are attached to CPUs A 11 and B 13, respectively. In one example, communications subsystems 15 and 17 may implement NodeBus/RS-232 communications. Each communications subsystem is attached to a synchronous bit comparator 19 using data and synchronization (e.g., RTS/CTS) connections. Comparator 19 performs a bit-by-bit comparison of the data streams, keeping them in sync using the synchronization connections. If the comparison agrees, the data is transmitted, bit-by-bit, to communications network 21. Network data is commonly received by the two communications subsystems and verified by CPU operations.

The technique depicted in FIG. 1, and described above, requires precise bit synchronization between the two communications subsystems. This synchronization is implemented using the synchronization signaling between the communications subsystems and synchronous bit comparator 19. Unfortunately, this technique is not generally applicable to many communications protocols because they do not provide facilities for the synchronization signaling required by this technique.

Turning to FIG. 2, a system employing another data comparison technique is depicted. In this example system, a message from CPU A 11 is formatted by its respective communications subsystem 15 and transmitted to communications subsystem 17 of CPU B 13. Communications subsystem B 17 compares the message received from communications subsystem A to the message that it intends to transmit. If the comparison agrees, the message is transmitted to network 21. One drawback to this technique is the requirement that each message be transmitted twice, with associated delays. That is, the message must first be transmitted from the first communications subsystem to the second communications subsystem, compared, and then transmitted from the second communications subsystem to the destination network.

The present invention is directed toward solutions to the above-described problems.

SUMMARY OF THE INVENTION

Briefly described, in a first aspect, the present invention includes a method of transmitting information to a network. The method includes receiving data from a first source into a first FIFO, and receiving data from a second source into a second FIFO. As data is received into the second FIFO, the data is transferred from the second FIFO to the network. When an end of message indication is detected in the received data, the first FIFO is compared to the second FIFO. If a miscompare occurs, the data transferred from the second FIFO to network is caused to be an error. Data exiting the first FIFO may be discarded throughout.

As an enhancement, upon miscompare, an error will be introduced into the data within the second FIFO prior to its transmission to the network. This error may include, for example, flipping at least one bit in the second FIFO, forcing at least one bit to a one or zero, or transmitting a protocol specific message abort pattern. Further, upon miscompare, transmission of the data from the second FIFO to the network may be prematurely terminated.

As a further enhancement, upon miscompare a signal may be sent to one or more of the first and second sources. The first and second sources may include at least one processor such that sending the signal may include generating an interrupt for the processor.

As yet another enhancement, a timer may be set upon initial receipt of data from the first source into the first FIFO. If the timer expires before comparing the FIFOs, a miscompare is declared and the transferred data from the second FIFO to network is caused to be an error.

The present invention also includes systems corresponding to the above-described methods. Particularly, in another aspect, the present invention includes a system for transmitting information to a network. The system includes first and second FIFOs for receiving data from first and second sources, respectively. Also, the system includes means for transferring data from the second FIFO to the network as data is received into the second FIFO. A means for detecting an end-of-message indication in the received data is also included in the system. Further, the system includes a means for comparing the first FIFO to the second FIFO upon detection of the end-of-message indication, and if a miscompare occurs transferred data from the second FIFO to the network is caused to be an error.

The present invention has several advantages and features associated therewith. The techniques disclosed represent a high-speed technique for insuring verification of the identity of redundant data streams prior to allowing successful transmission of them to a network. These techniques overcome the disadvantages of those used previously, in that dedicated signaling hardware is not needed for synchronization and the delays associated with store-compare-forward verification techniques are avoided.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF THE PREFERRED EMBODIMENT

Figure 1:
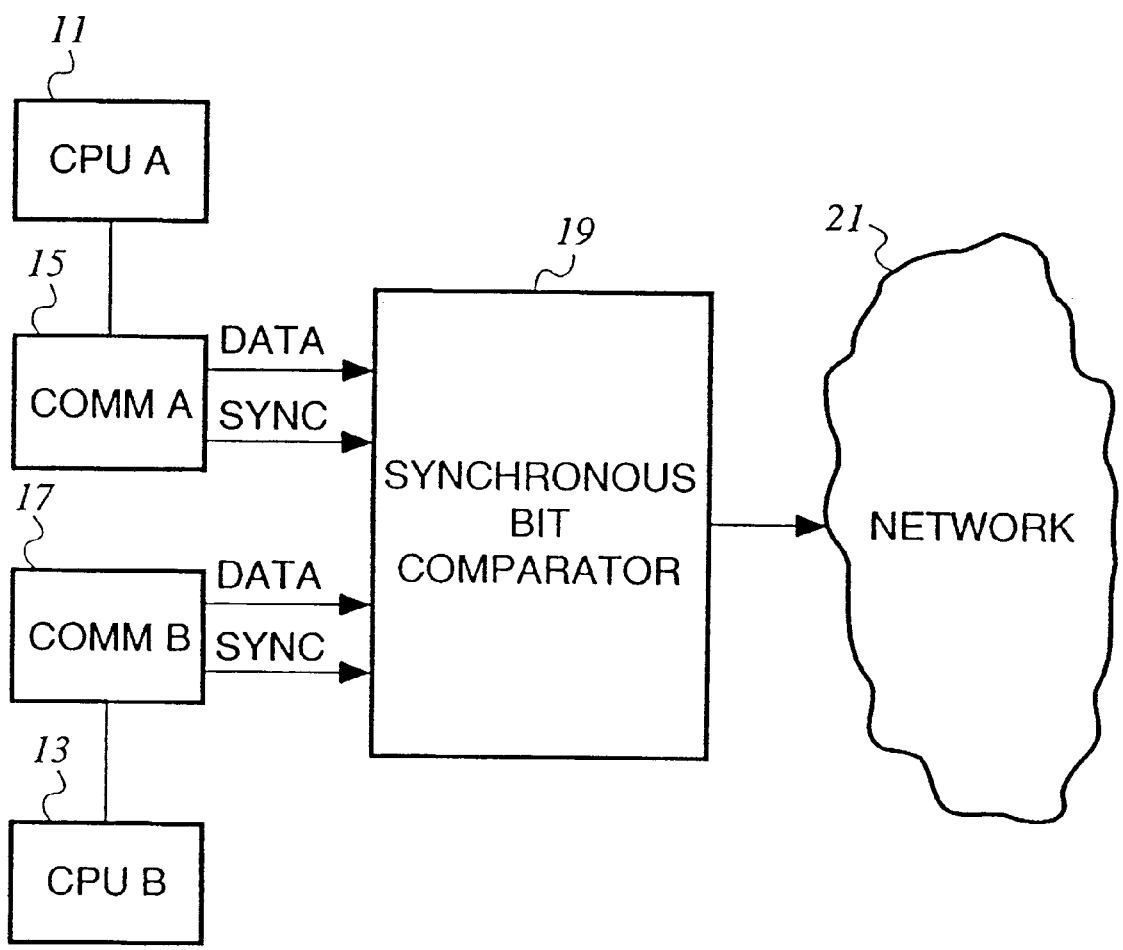
FIGS. 1–2 depict prior art systems.
Figure 2:
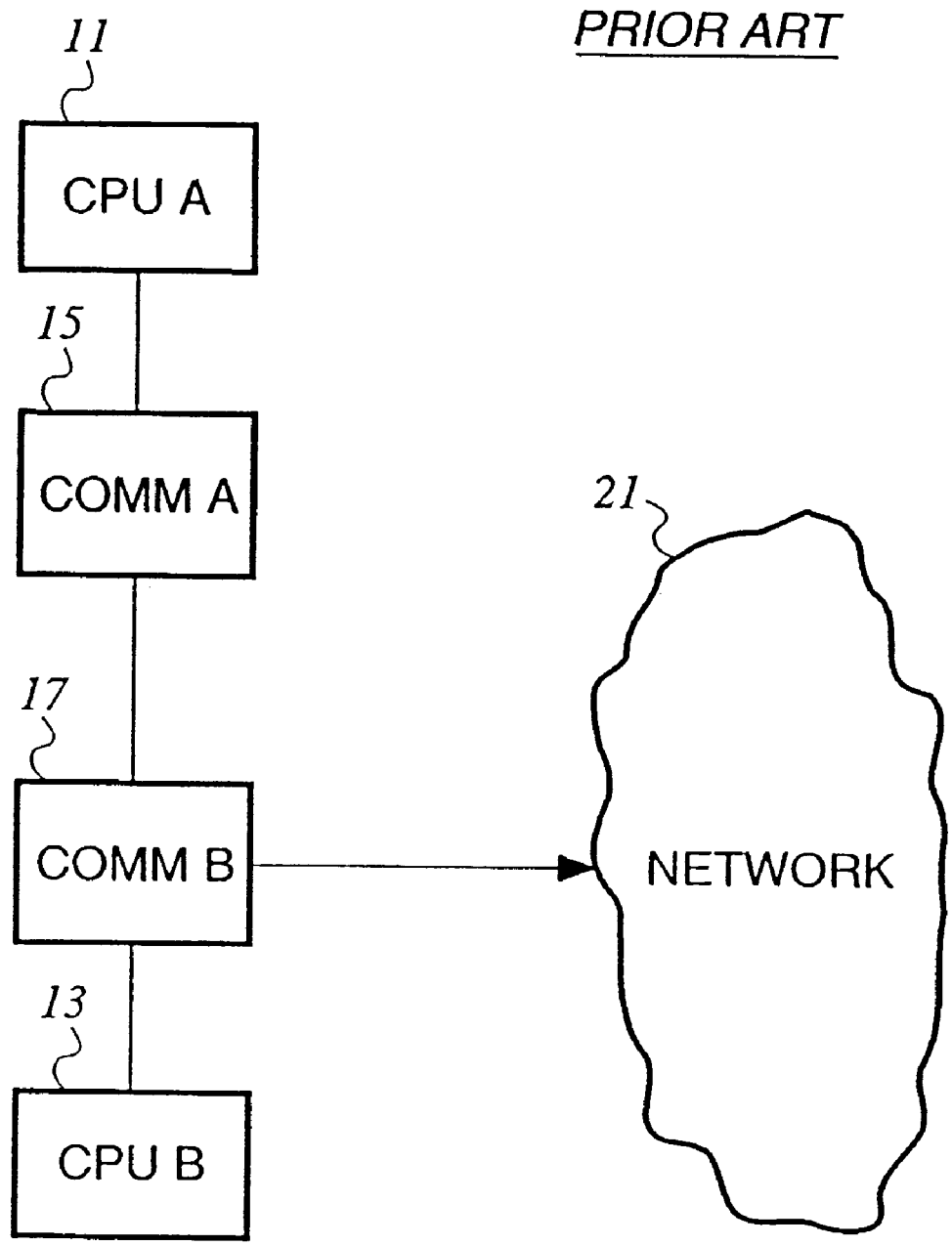
Figure 3:
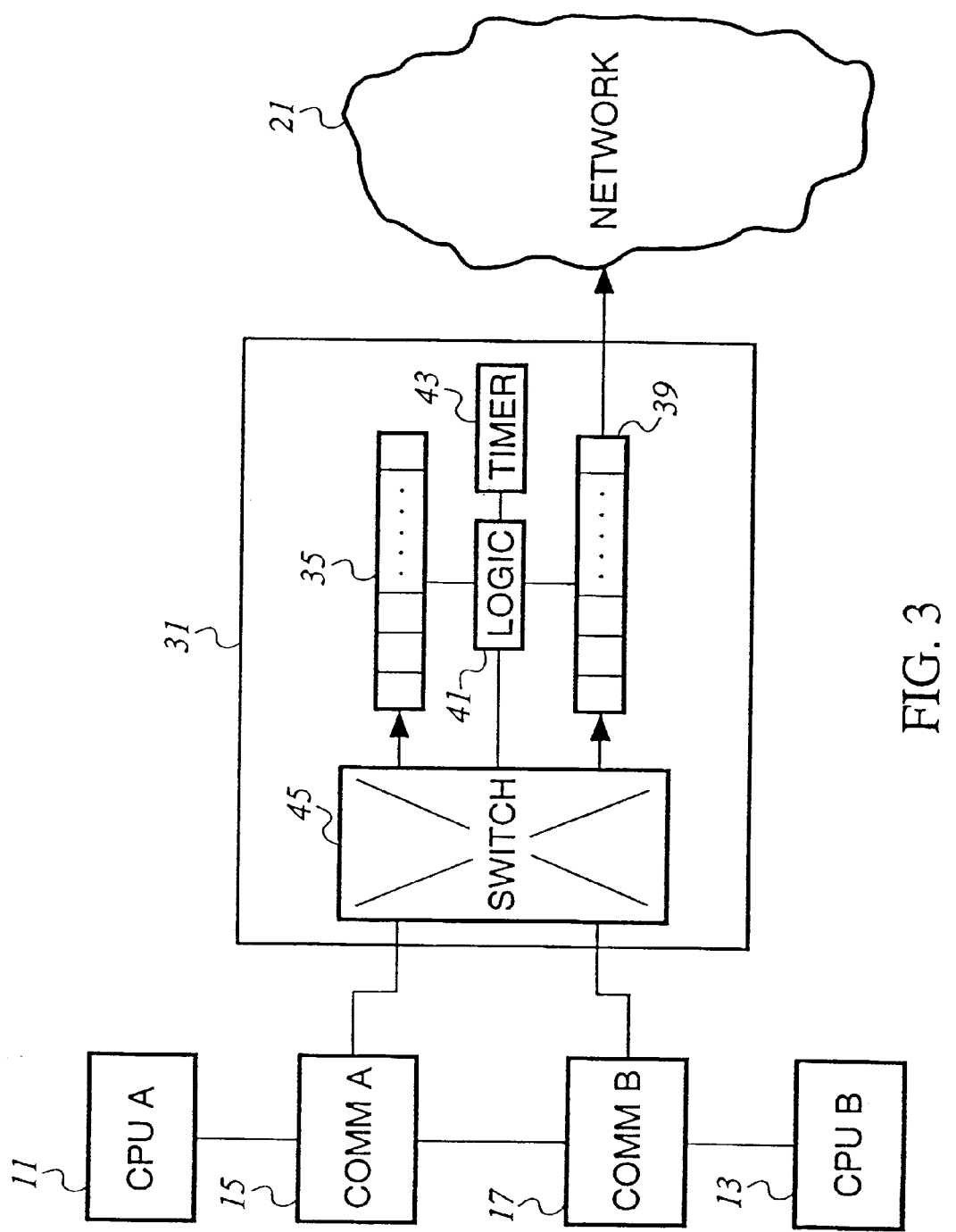
FIGS. 3–4 depict diagrams of fault-tolerant data transmission systems according to embodiments of the present invention.

Turning to FIG. 3, a system is depicted in accordance with the present invention. CPU A 11 and CPU B 13 operate in a fault-tolerant manner in that they redundantly process information. As the CPUs operate, they communicate to other entities over a network 21. A design goal is to insure that both CPUs agree on the message being sent to the network. Any difference in messages should result in the message not being successfully transmitted.

Communications subsystems 15 and 17 are coupled to their respective CPUs and manage network communications tasks including, for example, protocol specific message formatting. As one example, communications subsystems 15 and 17 may implement a Fast-Ethernet (802.3u) protocol. The transmit data outputs of each communication subsystem 15 and 17 are input to a data comparator 31. If the two communications subsystems 15 and 17 transmit identical messages, the message will be forwarded to network 21 by comparator 31.

In particular regard to the operation of the system of FIG. 3, and in particular regard to data comparator 31, a logic circuit 41 will detect the first CPU to send information, and then operate a switch 45 to direct that CPU's data through a FIFO A 35. The other CPU's data will be routed through switch 45 to a FIFO B 39.

For example, if CPU A 11 is first to begin transmitting, logic circuit 41 operates switch 45 to route CPU A's 11 data through FIFO A 35. As each bit is transmitted, it is shifted into the FIFO. However, the output from FIFO A 35 is discarded.

As a result of the above, the last n bits (n being the FIFO length) of CPU A's 11 message will remain in FIFO A 35. These last n bits will contain an end-of-message flag preceded by the message checksum (many protocols, including HDLC and Fast-Ethernet, complete a message with a checksum followed by an end-of-message flag). The size of FIFO A 35 (and FIFO B 39) is designed to accommodate the end-of-message flag and preceding message checksum.

After CPU A 11 begins transmitting its message into FIFO A 35 (through communications subsystem A 15), CPU B 13 begins transmitting its version of the same message though communications subsystem B 17 and into FIFO B 39 of comparator 31. FIFO B 39 shifts data out onto network 21. Thus, the message from CPU B 13 passes transparently through FIFO B 39 and onto network 21.

Upon completion of the message from CPU B 13, logic 41 detects the end-of-message flag within FIFO B 39. Logic 41 then compares the contents of FIFO B 39 to the contents of FIFO A 35. Accordingly, the ends of the messages from CPU A 11 and CPU B 13 are compared to each other. Since the ends of the two messages each contain their respective checksums, a comparison therebetween will detect any differences between the messages.

If the messages are the same, the remainder of the message from CPU B 13 is shifted out of FIFO B 39 and onto network 21 using the normal bit clock. If the messages are not the same, the contents of FIFO B 39 are disturbed (e.g., one or more bits may be flipped or forced to a zero or one value) such that the message shifted out has an erroneous checksum, or the message transmission may be prematurely terminated. Therefore, the receiving node will reject the message and the disagreement between the two CPUs will not result in a successful message transmission. Alternatively, some protocols include a predetermined message abort sequence which can by transmitted such that the attached switch will disregard the incomplete message. As an enhancement, an interrupt, or other signal, may sent by comparator 31 to one or more of the CPUs informing them of the miscompare.

Data comparator 31 also includes a timer 43 that functions in connection with logic 41. Upon detection of a first message, logic 41 initializes timer 43. If timer 43 expires prior to a comparison being performed, a miscompare is declared and data comparator 31 is reset. The timeout value for timer 43 is set based upon parameters such as bit-rate, expected maximum message length and expected time relationship between messages. As an example, in a 100 Mbps network with a maximum message length of 12144 bits, wherein the messages from both CPUs should not be separated from each other more than 8000 bits, the timer can be set for 201 us.

Figure 4:
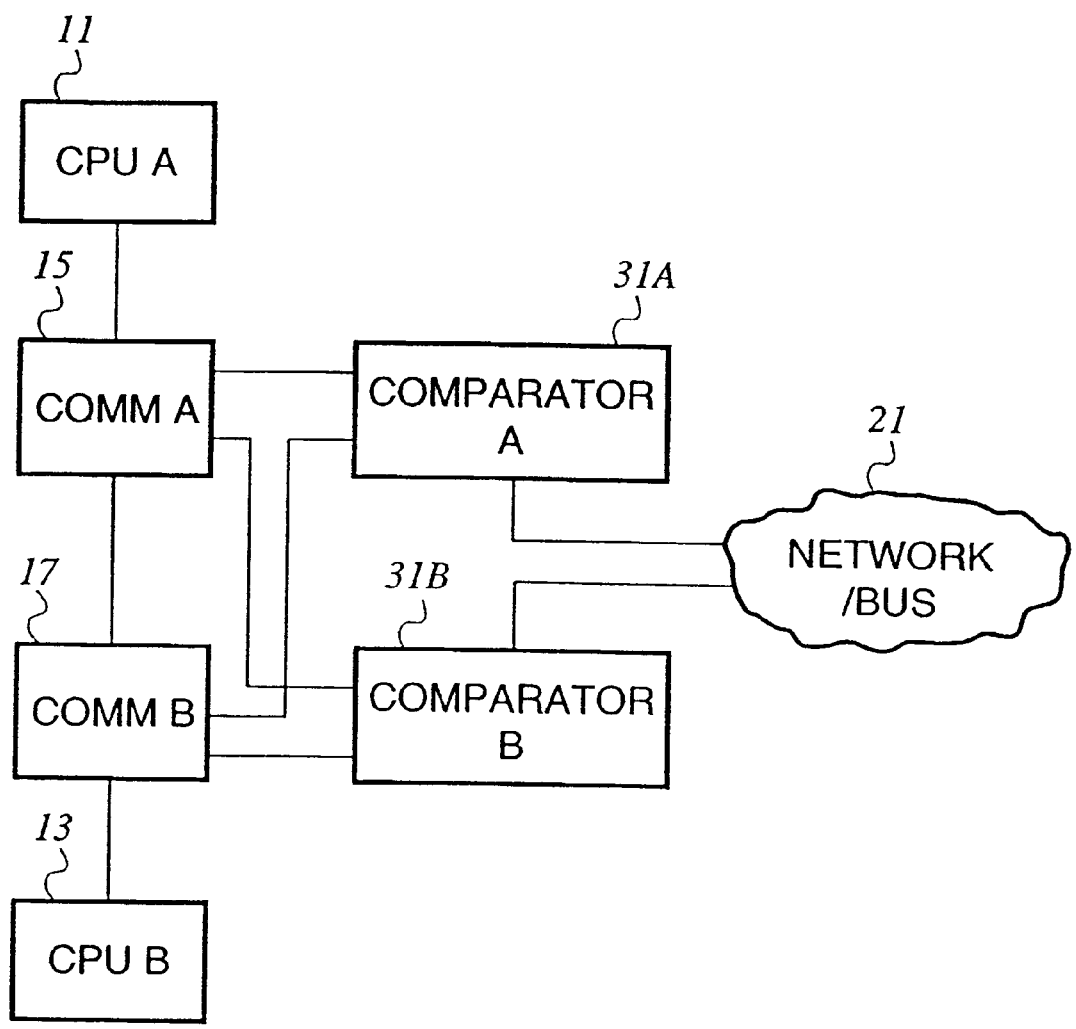

In the embodiment of FIG. 4, a further redundant configuration is depicted wherein each processor/communications system has it own comparator (e.g., 31A & 31B) associated therewith. During normal operation, comparator A 31A operates as described hereinabove to insure verified transmission of data. However, when, for example, a fault condition occurs (e.g., network connection fault, hardware failure or protocol level failure) communication subsystems 15 and 17 will direct their transmissions to comparator B 31B. The outputs of the comparators 31A and 31B are directed to the same destination network.

Figure 5:
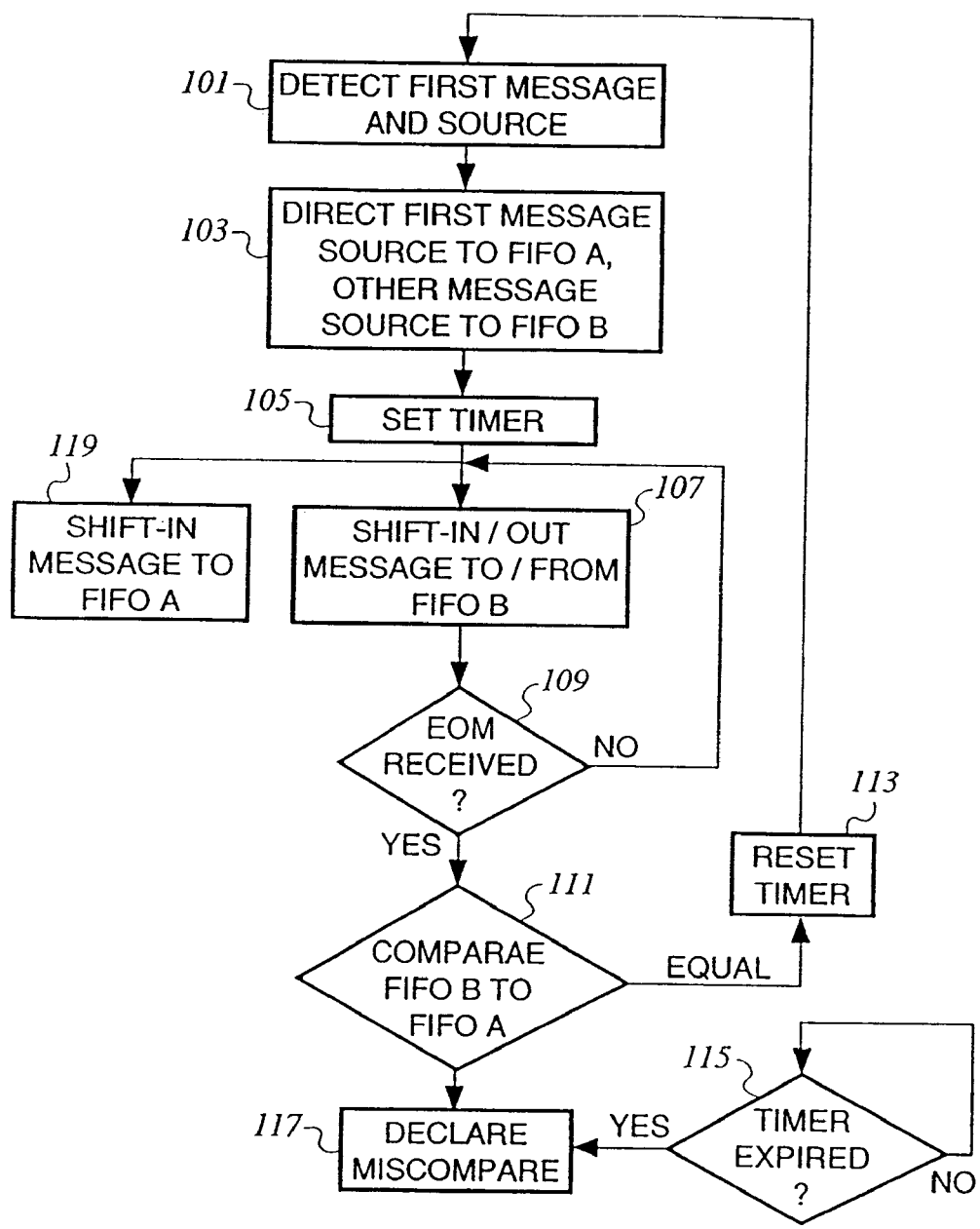
FIG. 5 is a flow diagram of operational techniques used pursuant to the present invention.

By way of summary, and turning to FIG. 5 (with reference to comparator 31 of FIG. 3), a flow diagram depicts the operation of comparator 31 described herein. To begin, a first message will arrive on one of the two inputs of comparator 31 (STEP 101). This first message will be detected and directed into FIFO A 35 by switch 45. Also, the other comparator input will be directed into FIFO B 39 and timer 43 will be set (STEPS 103, 105).

As data arrives on the link routed to FIFO A 35, it will be shifted thereinto (STEP 119). While this occurs, data may arrive on the link routed to FIFO B 39 and will be shifter thereinto. The output of FIFO B is transmitted to network 21 (107). The above-described steps continue until an end-of-message is detected within FIFO B 39 (STEP 109).

When an end-of-message is detected in FIFO B 39, the contents of the FIFOs are compared (STEP 111). If the FIFO contents are identical, then a successful compare results, the contents of FIFO B 39 continue to be shifted-out to network 21, timer 43 is reset (STEP 113), and comparator 31 resets. If either the comparison results in inequality or timer 43 expires (STEP 115), a miscompare is declared (STEP 117). Upon miscompare, an error in data output to network 21 is affected and an interrupt in generated to the CPUs.

The present invention has several advantages and features associated with it. The techniques disclosed herein represent a high-speed technique for insuring verification of the identity of redundant data streams prior to allowing successful transmission thereof to a network. These techniques overcome the disadvantages of those used previously in that dedicated signaling hardware is not needed for message synchronization and the delays associated with store-compare-forward verification techniques are avoided.

While the invention has been described in detail herein, in accordance with certain preferred embodiments thereof, many modifications and changes thereto can be affected by those skilled in the art. Accordingly, it is intended by the appended claims to cover all such modifications and changes as fall within the true spirit and scope of the invention.

We claim:

1. A method of transmitting information to a network, said method comprising:

receiving data from a first source into a first FIFO;

receiving data from a second source into a second FIFO;

as data is received into the second FIFO, transferring data from said second FIFO to said network;

detecting an end-of-message indication in said received data; and upon detection of said end-of-message indication, comparing said first FIFO to said second FIFO and if a miscompare occurs, causing transferred data from said second FIFO to said network to be in error.

2. The method of claim 1, wherein data exiting said first FIFO is discarded.

3. The method of claim 1, wherein upon said miscompare, an error is introduced into data within said second FIFO prior to its transmission to said network.

4. The method of claim 3, wherein upon said error comprises a protocol specific message abort pattern.

5. The method of claim 3, wherein said introducing said error comprises flipping at least one bit in said second FIFO to a one or a zero.

6. The method of claim 3, wherein said introducing said error comprises forcing at least one bit in said second FIFO to a one or a zero.

7. The method of claim 1, wherein said causing transferred data from said second FIFO to said network to be in error comprises prematurely terminating transmission of said data within said second FIFO to said network.

8. The method of claim 1, wherein upon said miscompare, said method comprises sending a signal to at least one of said first source and said second source.

9. The method of claim 8, wherein said first source and said second source includes at least one processor and wherein said sending said signal comprises generating an interrupt for said at least one processor.

10. The method of claim 1, wherein a timer is set upon initial receipt of said data from said first source into said first FIFO.

11. The method of claim 10, wherein if said timer expires before said comparison of said FIFOs, a miscompare is declared and said transferred data from said second FIFO to said network is caused to be in error.

12. A method of transmitting information to a network, said method comprising:

receiving data from a first processor into a first FIFO;

receiving data from a second processor into a second FIFO;

as data is received into the second FIFO, transferring data from said second FIFO to said network;

detecting an end-of-message indication in said second FIFO; and upon detection of said end of message indication, comparing said first FIFO to said second FIFO and if a miscompare occurs, causing transferred data from said second FIFO to said network to be in error.

13. The method of claim 12, further comprising informing at least one of said first processor and second processor of said miscompare.

14. The method of claim 13, further comprising setting a timer upon initial receipt of said data from said first processor.

15. The method of claim 14, wherein if said timer expires before said receipt of said end-of-message indication, a miscompare is declared.

16. A system for transmitting information to a network, said system comprising:

a first FIFO for receiving data from a first source;

a second FIFO for receiving data from a second source;

means for transferring data from said second FIFO to said network as data is received into the second FIFO; and means for detecting an end-of-message indication in said received data; and means for comparing said first FIFO to said second FIFO upon detection of said end-of-message indication, and if a miscompare occurs, means for causing transferred data from said second FIFO to said network to be in error.

17. The system of claim 16, further comprising means for, upon miscompare, introducing an error into data within said second FIFO prior to its transmission to said network.

18. The system of claim 17, wherein said error comprises a protocol specific message abort pattern.

19. The system of claim 16, further including a timer set upon initial receipt of said data from said first source into said first FIFO.

20. The system of claim 19, wherein said system includes means for detecting if said timer expires before said comparison of said FIFOs and means for declaring miscompare.

21. A method for transmitting fault-tolerant information, comprising, receiving a first data stream for input to a first FIFO, receiving a distinct second data stream for input to a distinct second FIFO, transmitting data from one of the first FIFO or the second FIFO, detecting an end-of-message indicator in the first data stream, comparing the first FIFO to the second FIFO, and introducing an error in the transmitted data if the first FIFO and the second FIFO do not compare.

22. A method according to claim 21, further comprising, initiating a timer upon receiving the first data stream.

23. A method according to claim 22, wherein comparing the first FIFO to the second FIFO further comprises performing a comparison of the first FIFO and the second FIFO until the timer expires.

24. A method according to claim 22, wherein comparing the first FIFO to the second FIFO further comprises performing a comparison of the first FIFO and the second FIFO until the timer reaches a predetermined timer value.

25. A method according to claim 21, further comprising, providing the first FIFO with size at least equal to a combination of the end-of-message indicator and a check-sum message.

26. A method according to claim 21, further comprising, providing the second FIFO with size at least equal to a combination of the end-of-message indicator and a check-sum message.

27. A method according to claim 21, wherein receiving a first data stream for input to a first FIFO further comprises shifting the data in the first FIFO.

28. A method according to claim 21, wherein receiving a distinct second data stream for input to a distinct second FIFO, further comprises shifting the data in the second FIFO.

29. A method according to claim 21, wherein transmitting data from one of the first FIFO or the second FIFO further comprises, transmitting the data as it is shifted from one of the first FIFO or the second FIFO.

30. A method according to claim 21, wherein introducing an error in the transmitted data further comprises, introducing an error to a check-sum message.

* * * * *